United States Patent [19]

Skellon

[11] Patent Number: 6,149,357
[45] Date of Patent: Nov. 21, 2000

[54] APPARATUS FOR SECURING WORKHOLDING EQUIPMENT TO A MACHINE TOOL

[75] Inventor: Todd K. Skellon, Albion, N.Y.

[73] Assignee: The Gleason Works, Rochester, N.Y.

[21] Appl. No.: 09/439,547

[22] Filed: Nov. 12, 1999

Related U.S. Application Data

[60] Provisional application No. 60/108,718, Nov. 17, 1998.

[51] Int. Cl.$^7$ ........................................ B23C 9/00
[52] U.S. Cl. ...................... 409/132; 409/225; 279/2.03; 279/2.11
[58] Field of Search ................ 29/559; 409/132, 409/219, 225, 231, 233; 279/2.03, 2.11

[56] References Cited

U.S. PATENT DOCUMENTS

| | | | |
|---|---|---|---|
| 2,970,843 | 2/1961 | Bourguignon | 279/2 |
| 3,083,976 | 4/1963 | Stark . | |
| 3,130,978 | 4/1964 | Roojen | 279/4 |
| 3,244,427 | 4/1966 | Taschl . | |
| 3,357,709 | 12/1967 | Buck | 279/2 |
| 3,420,537 | 1/1969 | Walters | 279/2 |
| 3,468,552 | 9/1969 | Nardone | 279/4 |
| 3,490,778 | 1/1970 | Parker | 279/2 |
| 3,517,939 | 6/1970 | Jaehn . | |
| 3,604,717 | 9/1971 | Hohwart | 279/1 DC |
| 3,670,315 | 6/1972 | Fowler | 340/174.1 C |
| 3,697,092 | 10/1972 | Anthony | 279/4 |
| 3,716,246 | 2/1973 | Peterson | 279/2 |
| 3,735,994 | 5/1973 | Jaehn . | |
| 3,747,445 | 7/1973 | Piotrowski et al. | 82/44 |
| 3,761,008 | 9/1973 | Goulder | 279/2 |
| 3,776,071 | 12/1973 | Buck | 279/16 |
| 3,817,002 | 6/1974 | Carlson | 51/216 ND |
| 3,829,109 | 8/1974 | Koch . | |
| 3,873,107 | 3/1975 | Hohwart et al. | 279/1 D |
| 3,881,604 | 5/1975 | Eggemeier | 214/1 BC |
| 3,909,021 | 9/1975 | Morawski et al. | 279/2 R |
| 3,945,652 | 3/1976 | Hohwart et al. | 279/1 D |
| 4,062,552 | 12/1977 | Kitaguchi | 279/1 TS |
| 4,106,784 | 8/1978 | Davis | 279/2 R |
| 4,198,066 | 4/1980 | Deprez et al. . | |
| 4,201,394 | 5/1980 | Morawski | 279/2 R |
| 4,208,061 | 6/1980 | Morawski | 279/2 R |

(List continued on next page.)

FOREIGN PATENT DOCUMENTS wo 83/03562  10/1983  WIPO .................................. 279/2.03

*Primary Examiner*—David P. Bryant
*Assistant Examiner*—Essama Omgba
*Attorney, Agent, or Firm*—Robert L. McDowell

[57] ABSTRACT

An assembly positionable on the spindle of a machine tool for securing a workholding apparatus in position on the machine tool. The assembly comprises first and second end portions and an inner piston axially movable within an inner chamber formed by the first and second end portions when assembled together. The piston, first end portion and second end all comprise central openings which permit the draw bar of a workholding apparatus to pass therethrough and into engagement with a draw rod of a machine tool. The piston includes springs, to urge it in a retracting direction, and spaced apart lugs to engage similar lugs on the workholding apparatus for securing the workholding apparatus to the assembly and thus to the spindle. Retraction of the draw rod results in the springs urging the piston, and hence the lugs of the workholding apparatus, in the retracting direction to secure the workholding apparatus to the assembly. Further retracting movement of the draw rod pulls the draw bar to activate the clamping mechanism for securing a workpiece for machining. The draw bar is advanced by advancing movement of the draw rod to release a clamped workpiece. Further advancing movement of the draw rod produces contact with the piston to advance it thus overcoming the force exerted by the springs thereby loosening the workholding apparatus from its secured position and enabling disengagement of the lugs. The motion of a single machine tool draw rod can, therefore, accomplish tasks that formerly required two draw rods with their respective hydraulic or pneumatic systems.

8 Claims, 3 Drawing Sheets

U.S. PATENT DOCUMENTS

| | | | |
|---|---|---|---|
| 4,215,605 | 8/1980 | Toth et al. | 82/40 R |
| 4,303,360 | 12/1981 | Cayen et al. | 409/233 |
| 4,540,187 | 9/1985 | Morawski et al. | 279/1 L |
| 4,565,476 | 1/1986 | Smith | 409/225 |
| 4,682,920 | 7/1987 | Rodgers | 409/231 |
| 4,688,321 | 8/1987 | Smith | 29/559 |
| 4,688,810 | 8/1987 | Waite | 279/1 A |
| 4,758,122 | 7/1988 | Kubo . | |
| 4,875,693 | 10/1989 | Nowak et al. | 279/2 R |
| 5,044,841 | 9/1991 | Biera et al. | 408/36 |
| 5,062,749 | 11/1991 | Sheets | 408/240 |
| 5,149,111 | 9/1992 | Han | 279/2.03 |
| 5,228,814 | 7/1993 | Suwijn . | |
| 5,370,378 | 12/1994 | Weber et al. | 269/309 |
| 5,667,228 | 9/1997 | Fabris . | |
| 5,743,687 | 4/1998 | Ribic et al. | 409/225 |
| 5,816,581 | 10/1998 | Chase | 279/2.03 |
| 5,827,021 | 10/1998 | Klement | 409/231 |
| 6,036,415 | 3/2000 | Sheehan et al. | 409/231 |

…

APPARATUS FOR SECURING WORKHOLDING EQUIPMENT TO A MACHINE TOOL

This application claims the benefit of U.S. Provisional Application No. 60/108,718 filed Nov. 17, 1998.

FIELD OF THE INVENTION

The present invention is directed to workholding equipment for machine tools and in particular to an apparatus for mounting workholding equipment to a machine tool such as a gear manufacturing machine.

BACKGROUND OF THE INVENTION

In metalworking operations where a workpiece is machined, equipment of some type is necessary to hold the workpiece in position in a machine tool so the machining process can be successfully carried out. This type of equipment is known as "workholding" equipment. In the production of toothed articles, such as gears, workholding equipment can be generally categorized as two types, chucks and arbors.

Chucks hold a workpiece by contracting a component called a "collet" around the workpiece or a component thereof. For example, when a bevel or hypoid pinion with integral shaft is placed in a chuck, it is usually the shaft that is gripped by the collet which has been reduced in diameter to grip the shaft to hold the pinion in position. Examples of chucks for gripping pinion shanks can be found in U.S. Pat. Nos. 3,083,976 to Stark and 3,244,427 to Taschl.

Arbors grip a workpiece by expanding a collet into contact with a surface of the workpiece. As an example, a bevel ring gear is placed on an arbor and the collet is expanded until contact of sufficient force is established with the surface of the bore of the ring gear to hold the ring gear in position during machining. An example of an arbor for a ring gear can be found in U.S. Pat. No. 3,735,994 to Jaehn. An arbor for expanding into contact with the bore of a pinion can be found in U.S. Pat. No. 3,517,939 to Jaehn and an expandable arbor for holding a stack of workpieces can be found in U.S. Pat. No. 4,198,066 to Deprez et al.

In either chucks or arbors, the force necessary to contract or expand the collet mechanism is usually provided by a draw rod in the machine tool. The draw bar is advanced and/or retracted usually with a hydraulically operated piston. In most instances, movement of the draw rod in the axial direction of the chuck or arbor causes opposed angled surfaces of components within the workholding equipment to slide relative to one another resulting in inward (contracting) or outward (expanding) movement of the collet to grip a workpiece or component part thereof. Generally, one angled surface is found on the collet and the other angled surface is found on an expander or actuator attached via a draw bar to the draw rod.

In addition to the hydraulic mechanism required for advancing and withdrawing the draw rod for operating the collet, many machine tools include a second hydraulic system comprising a second draw rod for securing the workholding equipment in position on the machine tool. For example, in a machine for producing cylindrical gears (spur and/or helical) by hobbing, such as shown in U.S. Pat. No. 5,228,814 to Suwijn, a first hydraulic system is utilized to advance and retract a draw rod connected to an arbor for expanding and contracting a collet within the bore of one or more workpiece blanks. In addition, a second hydraulic system may be included to advance and retract a draw rod in a clamping mechanism for securing the arbor to the hobbing machine.

In recent years there has been a movement toward cutting both bevel and cylindrical gears in the absence of cutting fluids. Such processes are known in the art as "dry" processes. A discussion of dry hobbing of cylindrical gears can be found in Phillips, "New Innovations in Hobbing—Part II", *Gear Technology*, November/December 1994, pp. 26–30. With dry cutting, the expense of purchasing and disposing of coolant is eliminated as is the environmental hazard associated with smoke and oil mist generated during the cutting process. Furthermore, equipment for removing smoke and mist from the machining chamber, and for separating metal chips from coolant, is no longer necessary thus reducing the cost of the particular machine.

In addition to the cost and environmental advantages of eliminating coolant from the cutting process, reducing or eliminating hydraulic liquids from machine systems (such as workholding or workpiece clamping systems) brings similar benefits. Eliminating hydraulic liquid (such as oil) from a machine system brings with it reduced costs since there is no need to purchase, or dispose of, the hydraulic liquid. Furthermore, the hazard and expense of cleaning up hydraulic liquid resulting from broken hoses is also eliminated. It can be seen that advantages exist for ridding the machine tool of some or all systems utilizing hydraulic liquids.

Possibilities that exist for eliminating hydraulic fluids in machines are replacing hydraulic liquids with air, where appropriate, and/or combining the tasks performed by two or more hydraulic systems whereby the same tasks are accomplished by fewer, preferably one, hydraulic or pneumatic system.

It is an object of the present invention to provide an apparatus for securing workholding equipment to a machine tool whereby the workholding equipment is secured by the same machine system that performs clamping of a workpiece on the workholding equipment. Thus, a second separate system for securing the workholding equipment to the machine tool is no longer necessary.

SUMMARY OF THE INVENTION

The present invention is directed to an assembly positionable on the spindle of a machine tool for securing a workholding apparatus in position on the machine tool. The inventive assembly comprises first and second end portions and an inner piston axially movable within an inner chamber formed by the first and second end portions when assembled together.

The piston, first end portion and second end portion are all rotatable about an axis and all comprise central openings which permit the draw bar of a workholding apparatus to pass therethrough and into engagement with a draw rod of a machine tool. The piston includes means, preferably springs, to urge it in a retracting direction as well as attachment means, such as spaced apart lugs, to engage similar means on the workholding apparatus for securing the workholding apparatus to the assembly and thus to the spindle.

To secure the workholding apparatus to the assembly, the draw bar of the workholding apparatus is inserted through the assembly and into engagement with the draw rod. Also, attachment means of the workholding apparatus are brought into engagement with the attachment means of the piston and the draw rod is retracted out of engagement with the piston. The urging means thus forces the piston, and hence the attachment means of the workholding apparatus, in the retracting direction to secure the workholding apparatus to the assembly. Further retracting movement of the draw rod pulls the draw bar to activate the clamping mechanism for securing a workpiece in position for machining.

The draw bar is advanced by advancing movement of the draw rod to release a clamped workpiece. Further advancing movement of the draw rod produces contact with the piston to advance it thus overcoming the force exerted by the urging means thereby loosening the workholding apparatus from its secured position and enabling disengagement of the attachment means.

With the present invention, the motion of a single machine tool draw rod can accomplish tasks that formerly required two draw rods with their respective hydraulic or pneumatic systems.

DETAILED DESCRIPTION OF THE PREFERRED EMBODIMENT

The present invention will be discussed in detail with reference to the accompanying drawings.

Figure 1:
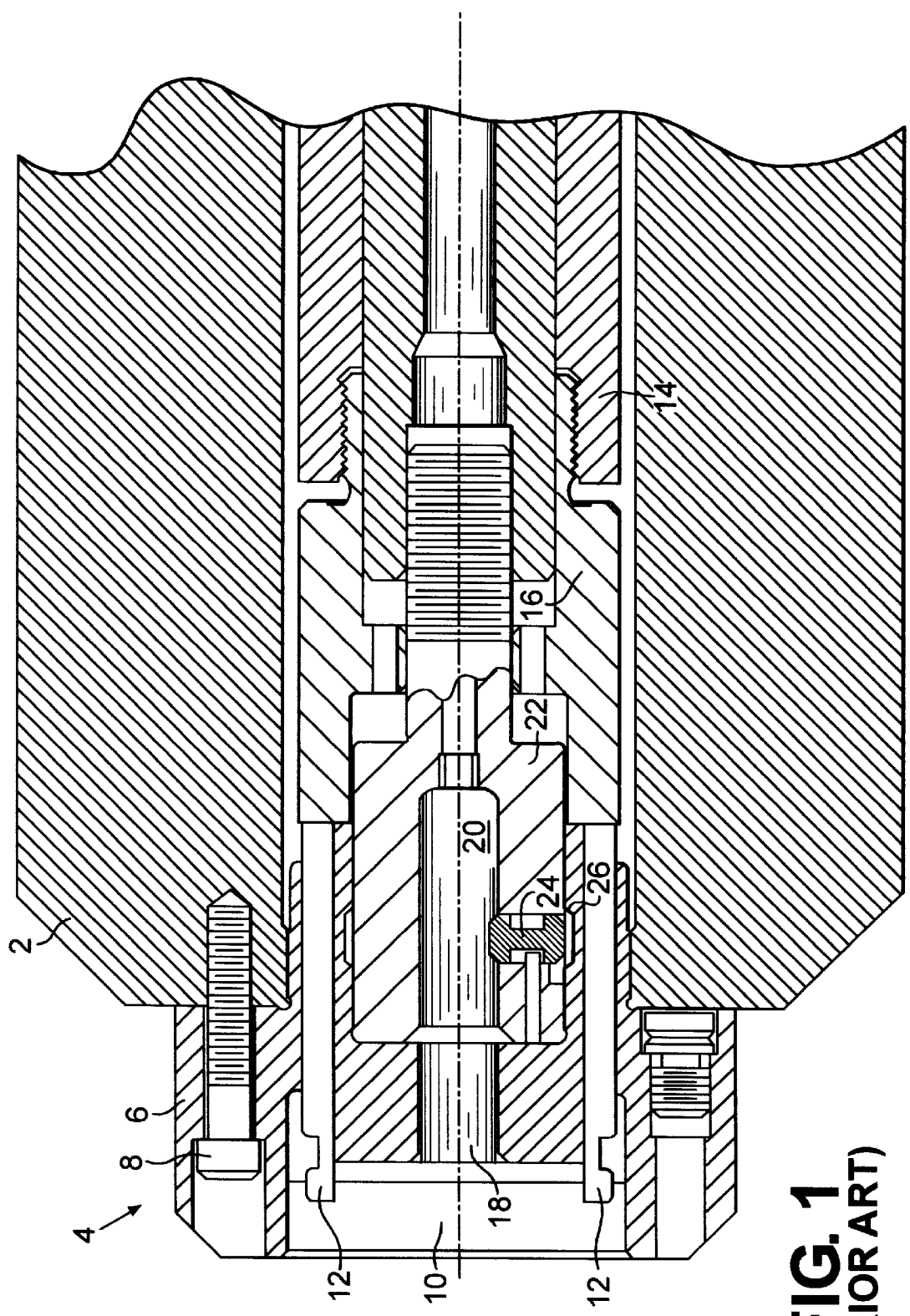
FIG. 1 illustrates a cross-sectional view of a known assembly for securing a workholding apparatus to a machine tool spindle.

FIG. 1 illustrates cross-sectional view of a known arrangement for securing a workholding apparatus, for example an arbor, to the spindle 2 of a machine tool, such as a hobbing machine for producing spur and helical gears.

Figure 3:
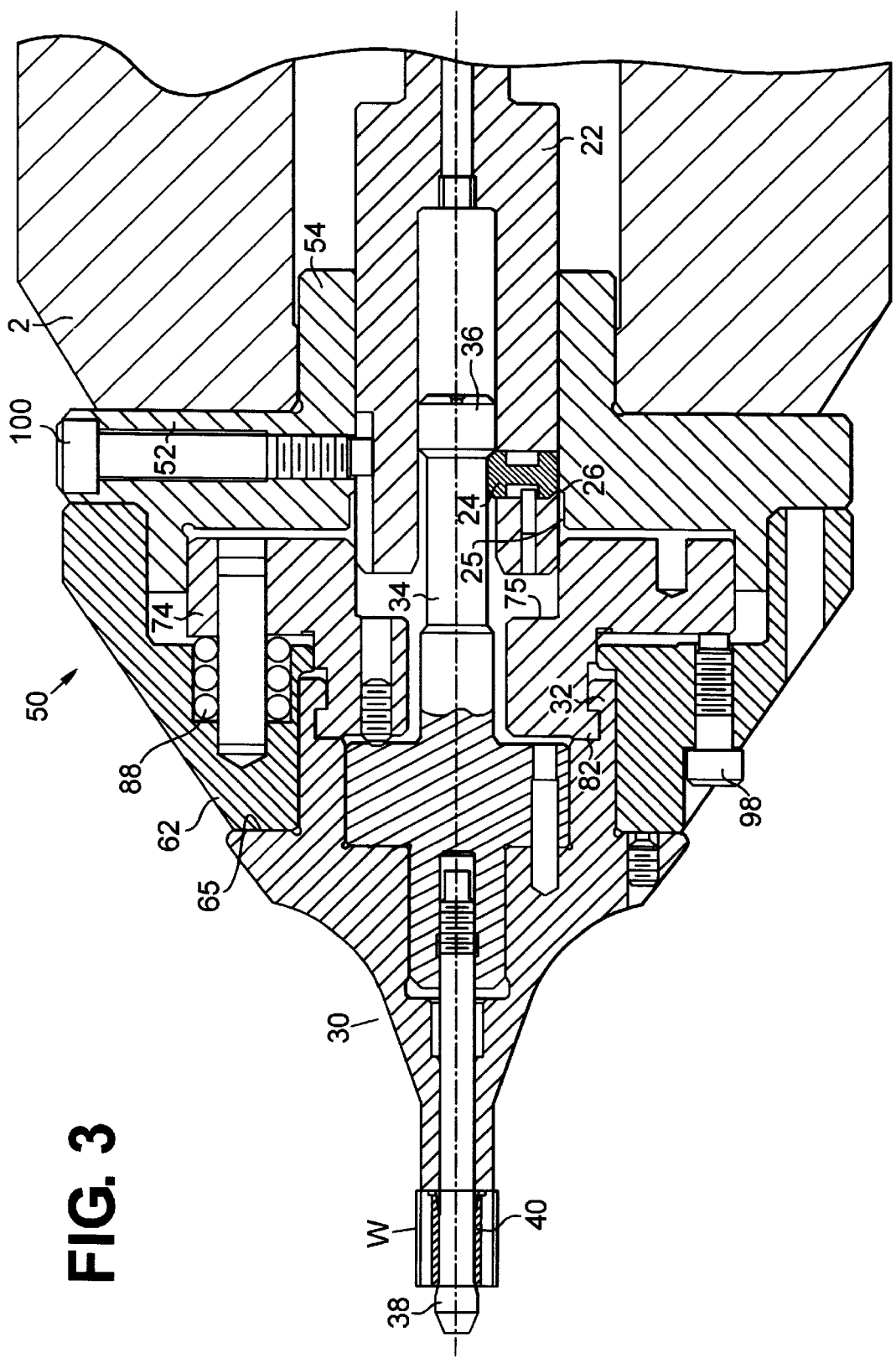
FIG. 3 illustrates a cross-sectional view of the inventive base assembly positioned on a machine tool spindle and an arbor secured to the base assembly.

A base assembly 4 with a head portion 6 is inserted into the opening of the spindle 2 and secured to the spindle by a plurality of screws, one of which is shown at 8. A workholding apparatus, such as an arbor 30 as shown in FIG. 3, is insertable into the opening 10 of the base assembly. The base assembly 4 comprises a plurality of lugs 12 which are engagable with corresponding lugs 32 on the workholding apparatus. Lugs 12 are retracted by a first machine draw rod 14 acting through connector 16 thereby clamping the workholding apparatus to the machine tool spindle 2.

The base assembly 4 further includes an inner opening 18 to allow passage of a draw bar 34 of the workholding apparatus into the open end 20 of a second machine draw rod 22 where it is held in position by a plurality, preferably three, of clamp lugs 24 (only one shown), which is forced radially inward by sloped surface 26 as draw rod 22 is retracted, to engage the end 36 of the draw bar of the workholding apparatus. Retraction of draw rod 22 pulls the workholding apparatus draw bar 34 inward thus causing an expander 38, located at the other end of draw bar 34, to expand a collet 40 into contact with one or more workpieces W thereby clamping the workpieces into position for machining.

Figure 2:
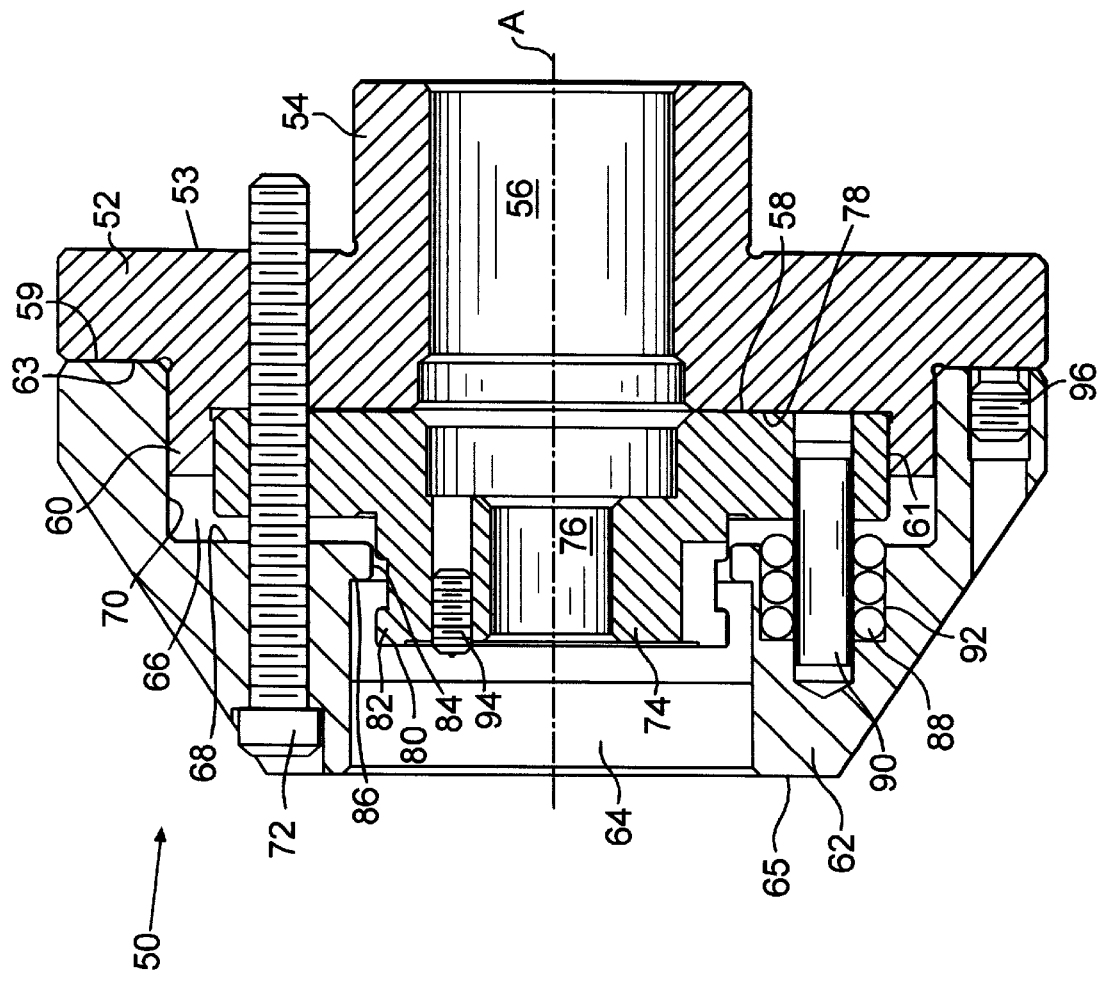
FIG. 2 is a cross-sectional view of the inventive base assembly for securing a workholding apparatus to a machine spindle.

FIG. 2 illustrates a cross-sectional view of the base assembly 50 of the present invention. The inventive base assembly 50 enables (1) a workholding apparatus, such as arbor 30 (see FIG. 3), to be secured to a machine tool spindle, and, (2) workpieces W to be clamped into position by the action of only one machine tool draw rod. Thus, where formerly two draw rods were required to perform the above tasks, as in FIG. 1, the present invention eliminates the need for a second draw rod and its associated system components.

Inventive base assembly 50 comprises a first end portion 52 having first end surface 53 positionable adjacent the face of a machine tool spindle 2. Projecting from first end surface 53 is first axial projecting portion 54 which is insertable into the opening of the machine tool spindle. First end portion 52 includes an opening 56 arranged, preferably concentrically, about axis of rotation A and extending from second end surface 58 completely through first end portion 52. Positioned radially inward of the periphery of first end portion 52 is second axial projecting portion 60. Second end surface 58 lies radially inward of projecting portion 60 while abutment surface 59 extends between second projecting portion 60 and the periphery of first end portion 52.

The inventive base assembly 50 further includes second end portion 62 arranged outward (with respect to a machine tool spindle) of first end portion 52 and having a central axial opening 64 extending therethrough. Second end portion 62 comprises a first end surface 63, second end surface 65 and is formed to include an inner recess 66 having an inner face 68 and a wall surface 70, preferably axially concentric, of a size sufficient to allow the insertion of second axial projecting portion 60 adjacent to wall surface 70 when assembling the base assembly 50.

First end portion 52 and second end portion 62 are positioned together such that first end surface 63 is adjacent abutment surface 59 and secured to a spindle of a machine tool by a plurality of screws 72, preferably three or four, (only one shown) which extend into the face of the spindle.

With end portions 52 and 62 positioned together, it can be seen that inner recess 66 and second end surface 58 form a chamber in which is positioned axially movable piston 74. Piston 74 includes a central opening 76 which is aligned with openings 56 and 64 to enable passage of a draw bar of a workholding apparatus (34 in FIG. 3) to or from engagement with a draw rod of a machine tool.

Piston 74 comprises a first end surface 78, abuttable against second end surface 58 of first end portion 52, and a second end surface 80. A plurality of lugs 82, preferably three or four, are located adjacent end surface 80 and are preferably equidistantly spaced about axis A. Lugs 82 are engagable with correspondingly spaced lugs 32 (FIG. 3) of a workholding apparatus whereby the workholding apparatus can be secured to the machine tool. Piston 74 is slidable along the inner surface 61 of second axial projecting portion 60 as well as along surface 84 of inner radial projection 86 in second end portion 62. Of course it can be seen that the chamber formed by recess inner 66 and second end surface 58 must be of sufficient axial dimension to allow axial movement of piston 74. It is also evident that piston 74 must be placed in position prior to assembling first and second end portions 52 and 62.

Piston 74 is held in position against second end surface 58 by a plurality of springs 88, preferably two or more, located about a guide pin 90 with each spring 88 positioned in a respective recess 92 formed in the inner face 68 of second end portion 62. Springs 88 exert force to urge piston 74 toward second end surface 58 which, in this rearward most position, maintains the workholding apparatus secured to the machine tool since in this, position, lugs 82 are retracted thus exerting maximum force on lugs 32 (FIG. 3) thereby maintaining the workholding apparatus in position on the machine tool. One or more ball detents 94 may be included to serve as a stop for limiting the amount of retraction of a draw bar to some predetermined amount. Also, one or more ejector screws 96 may be included for separating first and second end portions 52 and 62 upon disassembly of the base assembly 50.

FIG. 3 illustrates the inventive base assembly 50 positioned on a machine tool spindle 2 and having a workholding apparatus, arbor 30, secured to the base assembly 50.

In FIG. 3, base assembly 50 is positioned on spindle 2 by screws 72 with first axial projection portion 54 being inserted into the opening in spindle 2. Draw rod 22 is advanced (to the left in FIG. 3) such that it contacts piston 74 at surface 75 and advances piston 74 to compress spring 88 thus advancing lugs 82. Arbor 30 is then installed by inserting draw bar 34 into the end of the draw rod 22 past clamp lugs 24 while simultaneously inserting lugs 32 through the spaces formed between lugs 82. The arbor 30 is turned to engage lugs 32 with lugs 82. Draw rod 22 is then retracted (moved to the right in FIG. 3) and as retraction occurs, piston 74 is also retracted due to the force of the springs 88 such that once contact is lost between draw rod 22 and surface 75, piston 74 along with lugs 82 and 32 are retracted their maximum amount thus securing the arbor 30 to the base assembly 50 and spindle 2. If desired, piston 74 may be locked in the retracted position by one or more lock screws 98.

As draw rod 22 is retracted, clamp lugs 24, which had been in a retracted position in recess 25, engage sloped surface 26 and are advanced so that they contact the end 36 of draw bar 34. Further retracted movement of draw rod 22 now pulls draw bar 34 rearward which in turn pulls expander 38 into collet 40 thereby expanding the collet to grip workpiece W for machining.

Once workpiece W is machined and is ready for removal from the arbor 30, draw rod 22 is advanced thus advancing draw bar 34 and expander 38 and contracting collet 40 thereby releasing workpiece W. Advancing movement of draw rod 22 can be limited by the presence of a lock screw 100 or advancement of draw rod 22 can be accomplished under controlled fluid pressure whereby sufficient pressure is supplied to release the workpiece W but there is not enough excess pressure to advance draw rod 22 to the point of impact with surface 75 of piston 74 although lock screws 98 would prevent advancing movement of piston 74.

To remove arbor 30 from base assembly 50, lock screws 98 and 100 are removed and draw rod 22 is further advanced such that clamp lugs 24 are located above recess 25 and draw rod 22 contacts surface 75 with sufficient force to advance piston 74. Contact between lugs 32 and 82 is thus loosened and the arbor 30 is moved away from the front surface 65 of second end portion 62. The arbor 30 can then be turned to disengage lugs 32 and 82 and pulled out of the base assembly 50 and spindle 2.

As discussed above, advancing movement of the draw rod 22 may be controlled by the fluid pressure of the respective hydraulic or pneumatic system. In such an instance, it is not necessary to include lock screws 98 and 100 since advancing movement may be carried out at a lower pressure in order to contract a collet and remove a workpiece, but further advancing movement may be carried out at higher pressures sufficient to overcome the force of springs 88 as is necessary to remove arbor 30. Of course, it is evident that springs of sufficiently high force must be used not only to adequately secure the arbor 30 to the base assembly 50 but also to be sufficiently higher than the force necessary to release the workpiece so as to ensure that releasing the workpiece will not dislodge the arbor 30 from the base assembly 50. With this arrangement, changing of workholding equipment can be carried out very quickly.

Although the invention has been illustrated and discussed with reference to a horizontal orientation, it is to be understood that the present invention is equally applicable in any orientation, such as a vertical orientation. Furthermore, the present inventive base assembly although discussed with reference to an arbor, may also be utilized with chucking mechanisms.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. An assembly positionable on a spindle of a machine tool for securing a workholding apparatus in position on said machine tool, said assembly having an axis of rotation which is coincident with an axis of rotation of said spindle when said assembly is positioned on said machine tool, said assembly comprising:

a first end portion having a periphery, an opening extending therethrough and arranged about said axis, and first and second end surfaces with said first end surface being positionable adjacent said spindle, said second end surface including an axial projecting portion located radially inward of said periphery with said axial projecting portion having an inner surface, a second end portion arranged adjacent said second end surface of said first end portion, said second end portion comprising an opening arranged about said axis and extending through said second end portion between a first end surface and a second end surface, said second end portion further comprising an inner recess having an inner face and an inner wall, a chamber defined by said inner recess and said second end surface of said first end portion when said first and second end portions are positioned together, a piston arranged in said chamber, said piston being axially movable in said chamber and comprising an opening arranged about said axis, said piston having a first end surface and a second end surface with said first end surface being located adjacent said second end surface of said first end portion, said piston further comprising means for releasably attaching said workholding apparatus, resilient means located between said second end portion and said piston for resiliently holding said first surface of said piston in abutment with said second surface of said first end portion.

2. The assembly of claim 1 wherein said piston includes a peripheral surface, said peripheral surface being in sliding contact with said inner surface of said axial projecting portion.

3. The assembly of claim 1 wherein said means for releasably attaching on said piston comprises a plurality of lugs located adjacent said second end surface of said piston.

4. The assembly of claim 1 wherein said resilient means comprises one or more springs.

5. The assembly of claim 1 wherein said second end portion further comprises a projection extending radially into the opening of said second end portion, said projection including an inner surface, said piston being slidable along said inner surface.

6. The assembly of claim 1 wherein said first end surface of said piston further includes an inner recess arranged about said axis, said inner recess comprising a stop surface against which a machine tool draw rod is abuttable to urge said piston away from said first end portion.

7. A method of positioning an assembly on a spindle of a machine tool for securing a workholding apparatus in position on said machine tool, said assembly having an axis of rotation which is coincident with an axis of rotation of said spindle when said assembly is positioned on said machine tool, said method comprising:

(a) providing an assembly including:

a first end portion having a periphery, an opening extending therethrough and arranged about said axis, and first and second end surfaces with said first end surface being positionable adjacent said spindle, said second end surface including an axial projecting portion located radially inward of said periphery with said axial projecting portion having an inner surface, a second end portion arranged adjacent said second end surface of said first end portion, said second end portion comprising an opening arranged about said axis and extending through said second end portion between a first end surface and a second end surface, said second end portion further comprising an inner recess having an inner face and an inner wall, a chamber defined by said inner recess and said second end surface of said first end portion when said first and second end portions are positioned together, a piston arranged in said chamber, said piston being axially movable in said chamber and comprising an opening arranged about said axis, said piston having a first end surface and a second end surface with said first end surface being located adjacent said second end surface of said first end portion, said piston further comprising means for releasably attaching said workholding apparatus, resilient means located between said second end portion and said piston for resiliently holding said first surface of said piston in abutment with said second surface of said first end portion, (b) mounting said assembly on a machine tool having a draw rod, (c) contacting said piston with said draw rod and advancing said draw rod whereby said piston is spaced from said first end portion, (d) providing a workholding apparatus comprising a draw bar, (e) inserting said draw bar through said openings in said second end portion, said piston and said first end portion and into engagement with said draw rod, (f) engaging attachment means on said workholding apparatus with said means for releasably attaching on said piston for releasably securing said workholding apparatus to said assembly, (g) retracting said draw rod out of contact with said piston whereby said resilient means urges said piston toward said first end portion to secure said workholding apparatus in said assembly.

8. The method of claim 7 further comprising;

mounting a workpiece on said workholding apparatus, retracting said draw rod by an additional amount so as to effect holding of said workpiece by said workholding apparatus.

* * * * *